United States Patent
Wan et al.

(10) Patent No.: US 11,098,917 B2
(45) Date of Patent: Aug. 24, 2021

(54) METHOD FOR CONTROLLING FRESH AIR MACHINE AND FRESH AIR MACHINE

(71) Applicants: GD MIDEA HEATING & VENTILATING EQUIPMENT CO., LTD., Foshan (CN); MIDEA GROUP CO., LTD., Foshan (CN)

(72) Inventors: Yongqiang Wan, Foshan (CN); Yongfeng Xu, Foshan (CN); Meibing Xiong, Foshan (CN); Bo Li, Foshan (CN); Wentao Shu, Foshan (CN); Xiaolong Qian, Foshan (CN); Rufeng Chen, Foshan (CN)

(73) Assignees: GD Midea Heating & Ventilating Equipment Co., Ltd., Foshan (CN); Midea Group Co., Ltd., Foshan (CN)

( * ) Notice: Subject to any disclaimer, the term of this patent is extended or adjusted under 35 U.S.C. 154(b) by 204 days.

(21) Appl. No.: 16/140,239

(22) Filed: Sep. 24, 2018

(65) Prior Publication Data
US 2019/0024924 A1 Jan. 24, 2019

Related U.S. Application Data (63) Continuation of application No. PCT/CN2017/083283, filed on May 5, 2017.

(51) Int. Cl.
*F24F 11/38* (2018.01)
*F24F 11/70* (2018.01)
(Continued)

(52) U.S. Cl.
CPC .............. *F24F 11/38* (2018.01); *F24F 11/49* (2018.01); *F24F 11/70* (2018.01); *F24F 11/76* (2018.01); *F24F 11/81* (2018.01); *F24F 2110/10* (2018.01)

(58) Field of Classification Search
CPC .. F24F 11/38; F24F 11/70; F24F 11/81; F24F 11/49; F24F 11/76; F24F 2110/10; F24F 11/30; F24F 11/32; F24F 11/63
See application file for complete search history.

(56) References Cited

U.S. PATENT DOCUMENTS

| | | | | |
|---|---|---|---|---|
| 4,569,476 A | * | 2/1986 | Watabe | G05D 23/1932 236/47 |
| 5,276,630 A | | 1/1994 | Baldwin et al. | |

(Continued)

FOREIGN PATENT DOCUMENTS

| | | |
|---|---|---|
| CN | 101504178 A | 8/2009 |
| CN | 104374049 A | 2/2015 |

(Continued)

OTHER PUBLICATIONS

GD Midea Heating & Ventilating Equipment Co., Ltd., Examination Report, IN201937000518, Apr. 21, 2020, 6 pgs.

(Continued)

*Primary Examiner* — Jessica Yuen
(74) *Attorney, Agent, or Firm* — Morgan, Lewis & Bockius LLP (57) ABSTRACT

The present disclosure provides a method for controlling a fresh air machine. The method for controlling the fresh air machine of an air-conditioner includes: determining whether a fault occurs in a return air temperature sensor of the fresh air machine when the fresh air machine operates normally; closing an internal valve corresponding to the fresh air machine and keeping a fan motor operating, when the fault occurs in the return air temperature sensor; determining whether a fault occurs in an delivery air temperature sensor of the fresh air machine; when the fault does not occur in the delivery air temperature sensor of the fresh air machine, obtaining an delivery air temperature of the fresh air machine and controlling the fresh air machine to operate (Continued)

again by using the obtained delivery air temperature as a new return air temperature. The present disclosure also provides a fresh air machine. The method for controlling the fresh air machine of the present disclosure may solve the problem that the fresh air machine cannot operate again when the fault occurs in the return air temperature sensor of the fresh air machine, thereby improving the usage experience of the user for the air-conditioner.

8 Claims, 5 Drawing Sheets

(51) Int. Cl.
  *F24F 11/81* (2018.01)
  *F24F 11/49* (2018.01)
  *F24F 11/76* (2018.01)
  *F24F 110/10* (2018.01)

(56) References Cited

U.S. PATENT DOCUMENTS

2015/0330924 A1  11/2015  Budde
2016/0273814 A1*  9/2016  Tiranno .................. F25B 6/02

FOREIGN PATENT DOCUMENTS

| CN | 104764148 A | 7/2015 |
|---|---|---|
| CN | 204943790 U | 1/2016 |
| CN | 106545960 A | 3/2017 |
| JP | H07-248167 A | 9/1995 |
| JP | H8-261540 A | 10/1996 |
| JP | H9-152175 A | 6/1997 |
| JP | H10-383494 | 2/1998 |
| JP | 2008-180404 A | 8/2008 |
| JP | 2011-158171 A | 8/2011 |
| KR | 10-0630831 B1 | 9/2006 |
| KR | 10-0656162 | 12/2006 |
| KR | 10-20100059522 | 6/2010 |
| KR | 10-20100062117 A | 6/2010 |

OTHER PUBLICATIONS

Midea, First Office Action, CN201610909255.9, dated Sep. 30, 2018, 13 pgs.
International Search Report, PCT/CN2017/083283, dated Aug. 9, 2017, 16 pgs.
Notification of Reasons for Refusal, JP2018-509820, dated Dec. 25, 2018, 5 pgs.
Notification of Reasons for Refusal, KR10-20177024638, dated Sep. 13, 2018, 7 pgs.
GD Midea Heating & Ventilating Equipment Co. Ltd, Midea Group Co. Ltd., Examination Report No. 1, AU2017347333, dated Aug. 22, 2019, 2 pgs.
GD Midea Heating & Ventilating Equipment Co., Ltd., Midea Group Co. Ltd., Requisition by the Examiner, CA3029657, Dec. 2, 2019, 6 pgs.

* cited by examiner

METHOD FOR CONTROLLING FRESH AIR MACHINE AND FRESH AIR MACHINE

RELATED APPLICATIONS

This application is a continuation application of PCT Patent Application No. PCT/CN2017/083283, entitled "FRESH AIR HANDLING UNIT CONTROL METHOD AND FRESH AIR HANDLING UNIT" filed on May 5, 2017, which claims priority to Chinese Patent Application No. 201610909255.9, filed with the Chinese Patent Office on Oct. 18, 2016, and entitled "FRESH AIR HANDLING UNIT CONTROL METHOD AND FRESH AIR HANDLING UNIT", all of which are incorporated herein by reference in their entirety.

TECHNICAL FIELD

The present disclosure relates to an air-conditioner field, and more particularly relates to a method for controlling a fresh air machine and a fresh air machine.

BACKGROUND

Temperature sensors are widely used in household electrical appliances (such as air-conditioners). Taking the temperature sensors in a fresh air machine (a ventilation device) of the air-conditioner as an example, in addition to a return air temperature sensor and a coil temperature sensor in an indoor unit, there is also a delivery air temperature sensor. However, when a plurality of temperature sensors are applied, a probability that a fault occurs in a corresponding machine is high. The common fault may include short circuit, open circuit and temperature drift of the temperature sensors. In the related art, when a fault occurs in the corresponding temperature sensor of the air-conditioner, it is common for the air-conditioner to issue a fault alarm message, so as to inform a user of the fault occurring in the corresponding temperature sensor. Further, the air-conditioner cannot start and operate again before the fault of the temperature sensor is removed, thus affecting usage experience of the user for the air-conditioner.

SUMMARY

A main objective of the present disclosure is to provide a method for controlling a fresh air machine, which aims to solve the problem that the fresh air machine cannot operate again when the fault occurs in the return air temperature sensor of the fresh air machine.

In order to realize the above objective, the present disclosure provides a method for controlling a fresh air machine. The method for controlling the fresh air machine includes:

determining whether a fault occurs in a return air temperature sensor of the fresh air machine when the fresh air machine operates normally;

closing an internal valve corresponding to the fresh air machine and keeping a fan motor operating, when the fault occurs in the return air temperature sensor;

determining whether a fault occurs in a delivery air temperature sensor of the fresh air machine;

when the fault does not occur in the delivery air temperature sensor of the fresh air machine, obtaining a delivery air temperature of the fresh air machine and controlling the fresh air machine to operate again by using the obtained delivery air temperature as a new return air temperature.

Preferably, determining whether a fault occurs in a return air temperature sensor of the fresh air machine when the fresh air machine operates normally includes:

detecting a return air temperature of the fresh air machine based on a first preset detection cycle when the fresh air machine operates normally;

recording a maximum return air temperature and a minimum return air temperature of the fresh air machine within a first preset period according to detected return air temperature of the fresh air machine;

determining whether a difference between the maximum return air temperature and the minimum return air temperature is greater than or equal to a first preset temperature deviation value;

when the difference between the maximum return air temperature and the minimum return air temperature is greater than or equal to the first preset temperature deviation value, determining that the fault occurs in the return air temperature sensor and issuing a fault alarm message of the return air temperature sensor.

Preferably, determining whether a fault occurs in a delivery air temperature sensor of the fresh air machine includes:

detecting a current delivery air temperature of the fresh air machine based on a second preset detection cycle, and recording a maximum delivery air temperature and a minimum delivery air temperature of the fresh air machine within a third preset period, when the fan motor operates for a second preset period;

determining whether a difference between the maximum delivery air temperature and the minimum delivery air temperature is less than a second preset temperature deviation value;

determining that the fault does not occur in the delivery air temperature sensor when the difference between the maximum delivery air temperature and the minimum delivery air temperature is less than the second preset temperature deviation value.

Preferably, after determining whether a difference between the maximum delivery air temperature and the minimum delivery air temperature is less than a second preset temperature deviation value, the method further includes:

when the difference between the maximum delivery air temperature and the minimum delivery air temperature is greater than or equal to the second preset temperature deviation value, determining that the fault occurs in the delivery air temperature sensor, issuing a fault alarm message of the delivery air temperature sensor and controlling the fresh air machine to stop operating.

Preferably, after controlling the fresh air machine to operate again by using the obtained delivery air temperature as a new return air temperature, the method further includes:

when the fresh air machine operates again to reach a fourth preset period, re-determining whether a fault occurs in the delivery air temperature sensor of the fresh air machine until the delivery air temperature reaches a preset indoor temperature.

In addition, in order to realize the above objective, the present disclosure also provides a non-transitory computer-readable storage medium having stored therein computer programs. When the programs are executed by a processor, the above method for controlling the fresh air machine is realized.

In addition, in order to realize the above objective, the present disclosure also provides a fresh air machine. The fresh air machine includes an inlet channel, an exhaust channel and a heat exchanger provided on the inlet channel, the exhaust channel being configured to exhaust indoor air to outdoor, and the inlet channel being configured to blow outdoor air to indoor after the outdoor air passes through heat exchanging of the heat exchanger. The fresh air machine further includes an apparatus for controlling the fresh air machine, and the apparatus includes:

a return air temperature fault detecting module, configured to determine whether a fault occurs in a return air temperature sensor of the fresh air machine when the fresh air machine operates normally;

a delivery air temperature fault detecting module, configured to determine whether a fault occurs in a delivery air temperature sensor of the fresh air machine;

a control module, configured to close an internal valve corresponding to the fresh air machine and to keep a fan motor operating when the fault occurs in the return air temperature sensor; and to obtain a delivery air temperature of the fresh air machine and control the fresh air machine to operate again by using the obtained delivery air temperature as a new return air temperature when the fault does not occur in the delivery air temperature sensor of the fresh air machine.

Preferably, the return air temperature fault detecting module includes:

a return air temperature detecting unit, configured to detect a return air temperature of the fresh air machine based on a first preset detection cycle when the fresh air machine operates normally and to record a maximum return air temperature and a minimum return air temperature of the fresh air machine within a first preset period according to detected return air temperature of the fresh air machine;

a return air temperature fault judging unit, configured to determine whether a difference between the maximum return air temperature and the minimum return air temperature is greater than or equal to a first preset temperature deviation value, and to judge that the fault occurs in the return air temperature sensor and issue a fault alarm message of the return air temperature sensor when the difference between the maximum return air temperature and the minimum return air temperature is greater than or equal to the first preset temperature deviation value.

Preferably, the delivery air temperature fault detecting module includes:

a delivery air temperature detecting unit, configured to detect a current delivery air temperature of the fresh air machine based on a second preset detection cycle, and to record a maximum delivery air temperature and a minimum delivery air temperature of the fresh air machine within a third preset period, when the fan motor operates for a second preset period;

a delivery air temperature fault judging unit, configured to determine whether a difference between the maximum delivery air temperature and the minimum delivery air temperature is less than a second preset temperature deviation value; and to judge that the fault does not occur in the delivery air temperature sensor when the difference between the maximum delivery air temperature and the minimum delivery air temperature is less than the second preset temperature deviation value.

Preferably, the delivery air temperature fault judging unit is further configured to:

when the difference between the maximum delivery air temperature and the minimum delivery air temperature is greater than or equal to the second preset temperature deviation value, judge that the fault occurs in the delivery air temperature sensor, issue a fault alarm message of the delivery air temperature sensor and control the fresh air machine to stop operating.

Preferably, the delivery air temperature fault judging unit is further configured to: re-determine whether the fault occurs in the delivery air temperature sensor of the fresh air machine until the delivery air temperature reaches a preset indoor temperature, when the fresh air machine operates again to reach a fourth preset period.

The present disclosure provides a method for controlling a fresh air machine. The method for controlling the fresh air machine includes: determining whether a fault occurs in a return air temperature sensor of the fresh air machine when the fresh air machine operates normally; closing an internal valve corresponding to the fresh air machine and keeping a fan motor operating, when the fault occurs in the return air temperature sensor; determining whether a fault occurs in a delivery air temperature sensor of the fresh air machine; when the fault does not occur in the delivery air temperature sensor of the fresh air machine, obtaining a delivery air temperature of the fresh air machine and controlling the fresh air machine to operate again by taking the obtained delivery air temperature as a new return air temperature. The method for controlling the fresh air machine provided in the present disclosure may solve the problem that the fresh air machine cannot operate again when the fault occurs in the return air temperature sensor of the fresh air machine, thereby improving the usage experience of the user for the air-conditioner.

BRIEF DESCRIPTION OF THE DRAWINGS

In order to more clearly illustrate the technical solutions in the embodiments of the present disclosure or in the related art, the accompanying drawings used in the description of the embodiments or the related art are briefly described hereunder. Obviously, the described drawings are merely some embodiments of the present disclosure. For persons skilled in the art, other drawings may be obtained based on these drawings without any creative work.

Implementations, features and advantages of the objective of the present disclosure further will be described with reference to the embodiments and the drawings.

DETAILED DESCRIPTION

It should be understood that the specific embodiments described herein are used to generally interpret the present disclosure and shall not be construed to limit the present disclosure.

Figure 1:
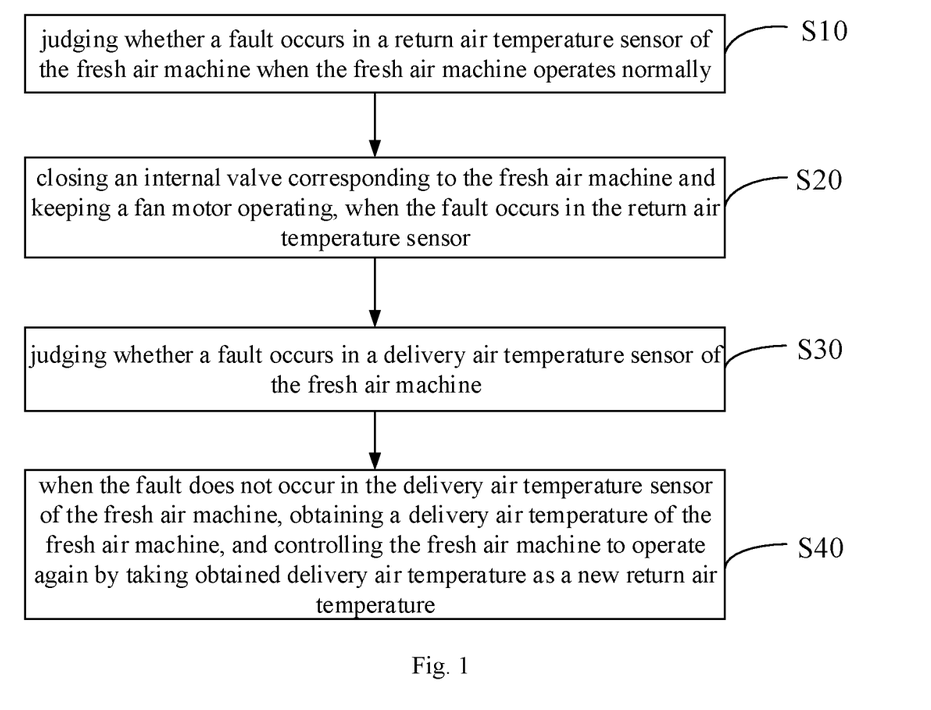
FIG. 1 is a flow chart of a method for controlling a fresh air machine according to a first embodiment of the present disclosure.

The present disclosure provides a method for controlling a fresh air machine. As illustrated in FIG. 1, in an embodiment, the method for controlling the fresh air machine includes followings.

In block S10, it is judged whether a fault occurs in a return air temperature sensor of the fresh air machine when the fresh air machine operates normally.

The method for controlling the fresh air machine provided in the embodiment of the present disclosure is mainly applied in a control system of the fresh air machine of an air-conditioner, and configured to solve the problem that the fresh air machine cannot operate again when the fault occurs in the return air temperature sensor of the fresh air machine, which thereby affects the usage experience of the user for the air-conditioner. In an air-conditioner system, the fresh air machine of the air-conditioner includes an inlet channel, an exhaust channel and a heat exchanger provided on the inlet channel. The exhaust channel is configured to exhaust indoor air to outdoor. The inlet channel is configured to blow outdoor air to indoor after the outdoor air passes through heat exchanging of the heat exchanger. The return air temperature sensor is provided at a return air inlet (i.e., a channel port of the exhaust channel of the fresh air machine) of the fresh air machine of the air-conditioner, and a delivery air temperature sensor is provided at a delivery air outlet (i.e., a channel port of the inlet channel of the fresh air machine) of the fresh air machine of the air-conditioner. The temperature at the return air inlet of the fresh air machine is detected by the return air temperature sensor and the temperature at the delivery air outlet of the fresh air machine is detected by the delivery air temperature sensor. The return air temperature of the fresh air machine is taken as a temperature control parameter of the fresh air machine to control the operation of the fresh air machine, so as to realize a control of indoor temperature. In detail, when the air-conditioner operates, the air-conditioner takes a target temperature (e.g., 26° C.) set by a user as a final target temperature and realizes the control of the indoor temperature by controlling a frequency of a compressor and/or a rotating speed of a fan motor in the fresh air machine, such that the indoor temperature may finally reach the target temperature (e.g., 26° C.) set by the user. In addition, it should be noted that, the indoor temperature is obtained by the return air temperature sensor at the return air inlet (i.e., the channel port of the exhaust channel of the fresh air machine) of the fresh air machine, i.e. the current return air temperature at the return air inlet of the fresh air machine is taken as the current indoor temperature.

In this embodiment, in order to solve the problem that the fresh air machine cannot operate again when the fault occurs in the return air temperature sensor of the fresh air machine, with the method for controlling the fresh air machine provided in the embodiment of the present disclosure, first, it is judged whether the fault occurs in the return air temperature sensor at the return air inlet of the fresh air machine when the fresh air machine operates normally.

In block S20, an internal valve corresponding to the fresh air machine is closed and a fan motor is kept operating when the fault occurs in the return air temperature sensor.

In detail, if the fresh air machine operates normally, the internal valve corresponding to the fresh air machine is closed (i.e., the fresh air machine is controlled to stop a refrigerant circulation) while the fan motor in the fresh air machine is controlled to operate continuously, when it is judged that the fault occurs in the return air temperature sensor of the fresh air machine. It should be noted that, in this embodiment, when the fault occurs in the return air temperature sensor, although the fresh air machine does not have a function of refrigeration and heating, it is still able to blow air from outdoor to indoor, thereby improving quality of indoor air.

In block S30, it is judged whether a fault occurs in the delivery air temperature sensor of the fresh air machine.

In block S40, when the fault does not occur in the delivery air temperature sensor of the fresh air machine, a delivery air temperature of the fresh air machine is obtained and the fresh air machine is controlled to operate again by taking the obtained delivery air temperature as a new return air temperature.

In detail, in this embodiment, when the fault occurs in the return air temperature sensor, the fan motor of the fresh air machine continuously operates while the internal valve corresponding to the fresh air machine is closed. At this moment, it is judged whether the fault occurs in the delivery air temperature sensor of the fresh air machine and it is determined whether to obtain the delivery air temperature according to a judgment result. In this embodiment, when it is judged that the fault does not occur in the delivery air temperature sensor of the fresh air machine, the delivery air temperature of the fresh air machine is obtained and the obtained delivery air temperature is taken as the new return air temperature to control the fresh air machine to operate again.

With the method for controlling the fresh air machine provided in the embodiment of the present disclosure, first, it is judged whether the fault occurs in the return air temperature sensor of the fresh air machine when the fresh air machine operates normally; then the internal valve corresponding to the fresh air machine is closed and the fan motor is kept operating, when the fault occurs in the return air temperature sensor; then it is judged whether the fault occurs in the delivery air temperature sensor of the fresh air machine; and then when the fault does not occur in the delivery air temperature sensor of the fresh air machine, the delivery air temperature of the fresh air machine is obtained and the fresh air machine is controlled to operate again by taking the obtained delivery air temperature as the new return air temperature. The method for controlling the fresh air machine in the present disclosure may solve the problem that the fresh air machine cannot operate again when the fault occurs in the return air temperature sensor of the fresh air machine, thereby improving the usage experience of the user for the air-conditioner.

Figure 2:
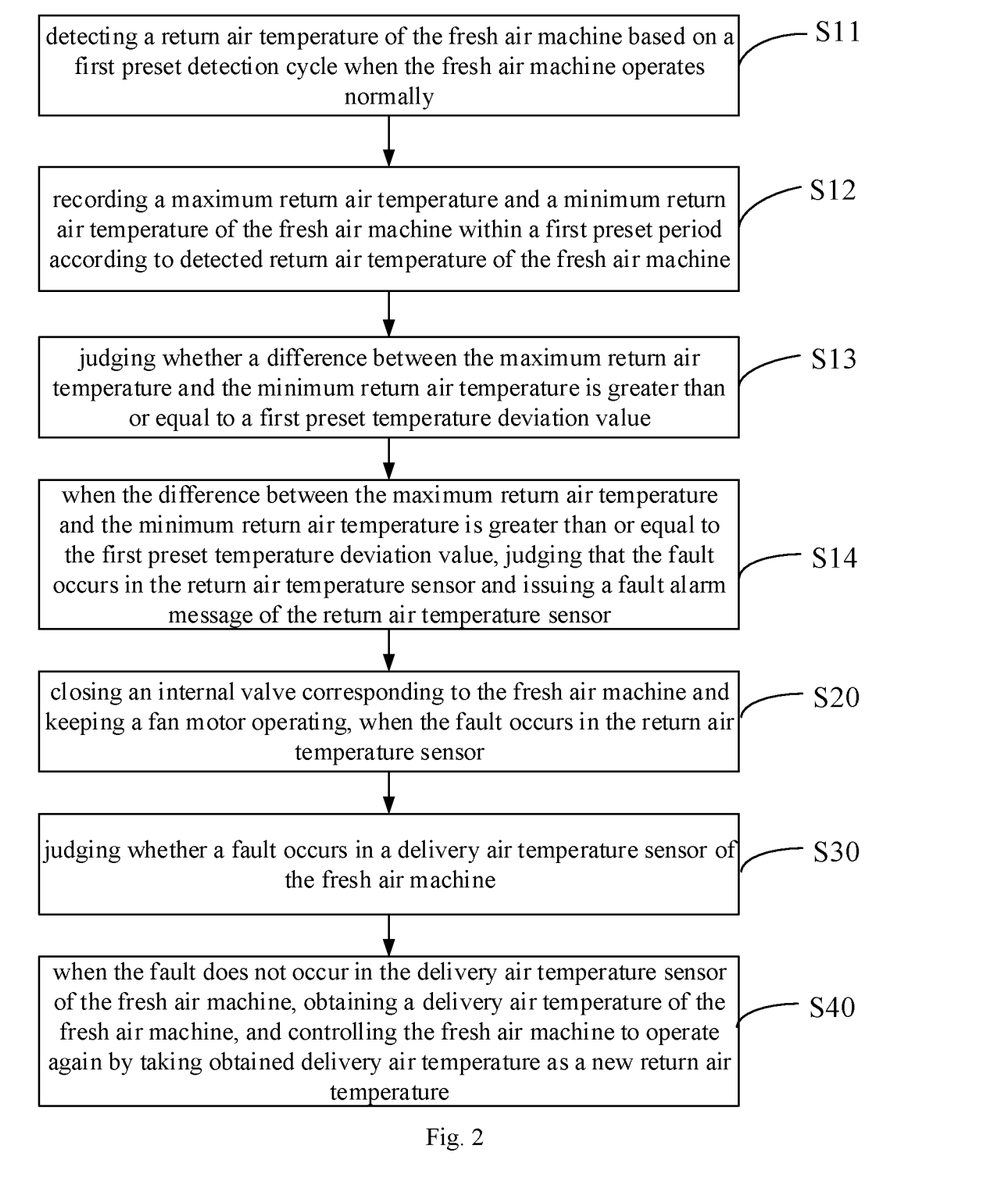
FIG. 2 is a flow chart of a method for controlling a fresh air machine according to a second embodiment of the present disclosure.

Further, as illustrated in FIG. 2, based on the method for controlling the fresh air machine provided in the first embodiment of the present disclosure, in the method for controlling the fresh air machine provided in the second embodiment of the present disclosure, block S10 includes followings.

In block S11, a return air temperature of the fresh air machine is detected based on a first preset detection cycle when the fresh air machine operates normally.

In block S12, a maximum return air temperature and a minimum return air temperature of the fresh air machine within a first preset period are record according to the detected return air temperature of the fresh air machine.

In block S13, it is judged whether a difference between the maximum return air temperature and the minimum return air temperature is greater than or equal to a first preset temperature deviation value.

In block S14, when the difference between the maximum return air temperature and the minimum return air temperature is greater than or equal to the first preset temperature deviation value, it is judged that the fault occurs in the return air temperature sensor and a fault alarm message of the return air temperature sensor is issued.

It is to be understood that, in one embodiment, it is judged whether the fault occurs in the return air temperature sensor by detecting whether the return air temperature sensor of the fresh air machine has open circuit or short circuit. In another embodiment, it is judged whether the return air temperature sensor has a temperature detection function and further it is judged whether the fault occurs in the return air temperature sensor. For example, when the return air temperature sensor detects no temperature, it is judged that the fault occurs in the return air temperature sensor.

In detail, with the method for controlling the fresh air machine provided in the embodiment, the return air temperature of the fresh air machine is detected every first preset detection cycle T, so as to obtain the current return air temperature of the fresh air machine. The first preset detection cycle T, the first preset period nT and the first preset temperature deviation value ΔT1 may be set according to actual situations. In this embodiment, the first preset detection cycle T may be from 10 seconds to 15 seconds, the first preset period nT may be from 2 minutes to 3 minutes, and the first preset temperature deviation value ΔT1 may be from 1.5° C. to 2° C. Preferably, in the embodiment, the first preset detection cycle T may be 10 seconds, the first preset period nT may be 2 minutes and the first preset temperature deviation value ΔT1 may be 1.5° C., which may be taken as example for detailed description below.

For example, when the fresh air machine operates normally, first, the return air temperature of the fresh air machine is detected every 10 seconds by the return air temperature sensor at the return air inlet of the fresh air machine; then, the maximum return air temperature T1max and the minimum return air temperature T1min within 2 minutes are recorded according to the return air temperature detected by the return air temperature sensor; then, it is judged whether the difference between the maximum return air temperature T1max and the minimum return air temperature T1min is greater than or equal to the first preset temperature deviation value ΔT1, i.e., it is judged whether |T1max−T1min|≥ΔT1 (that is whether |T1max−T1min|≥1.5° C.); when the difference between the maximum return air temperature T1max and the minimum return air temperature T1min is greater than or equal to 1.5° C., it is judged that the fault occurs in the return air temperature sensor at the return air inlet of the fresh air machine, and meanwhile, the fault alarm message of the return air temperature sensor is issued, so as to prompt the user that the fault occurs in the return air temperature sensor of the fresh air machine.

With the method for controlling the fresh air machine provided in the embodiment of the present disclosure, it is judged whether the fault occurs in the return air temperature sensor of the fresh air machine according to the maximum return air temperature T1max and the minimum return air temperature T1min recorded within the first preset period nT, and the first preset temperature deviation value ΔT1. When |T1max−T1min|≥ΔT1, it is judged that the fault occurs in the return air temperature sensor and the fault alarm message of the return air temperature sensor is issued. When the fault occurs in the return air temperature sensor, the internal valve corresponding to the fresh air machine is closed and the fan motor in the fresh air machine is kept operating; then it is judged whether the fault occurs in the delivery air temperature sensor of the fresh air machine; and then when the fault does not occur in the delivery air temperature sensor of the fresh air machine, the delivery air temperature of the fresh air machine is obtained and the obtained delivery air temperature is taken as the new return air temperature to control the fresh air machine to operate again, thereby improving the usage experience of the user for the air-conditioner.

Figure 3:
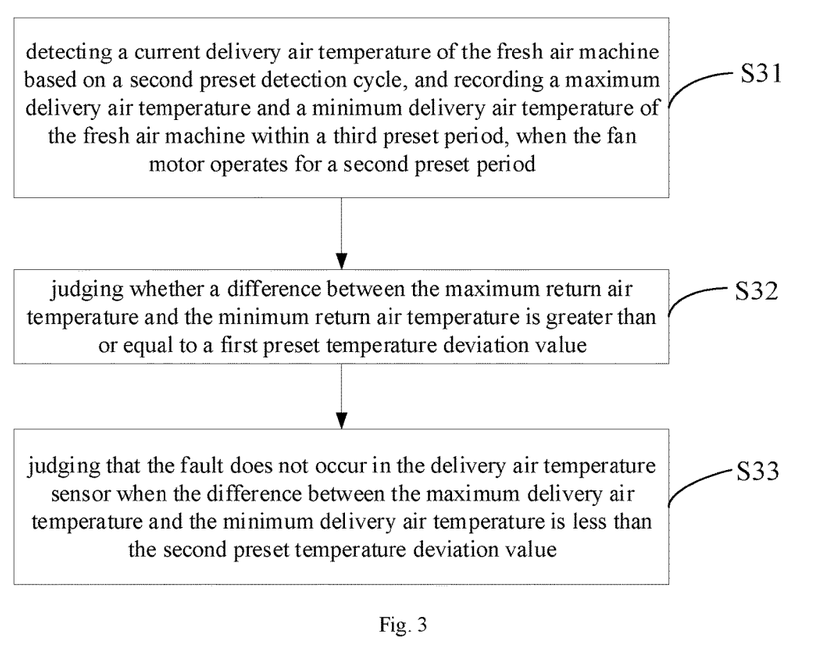
FIG. 3 is a flow chart of a method for controlling a fresh air machine according to a third embodiment of the present disclosure.

Further, as illustrated in FIG. 3, based on the method for controlling the fresh air machine provided in the first embodiment of the present disclosure, in the method for controlling the fresh air machine provided in the third embodiment of the present disclosure, block S30 includes followings.

In block S31, a current delivery air temperature of the fresh air machine is detected based on a second preset detection cycle, and a maximum delivery air temperature and a minimum delivery air temperature of the fresh air machine within a third preset period are record, when the fan motor operates for a second preset period.

In block S32, it is judged whether a difference between the maximum delivery air temperature and the minimum delivery air temperature is less than a second preset temperature deviation value.

In block S33, it is judged that the fault does not occur in the delivery air temperature sensor when the difference between the maximum delivery air temperature and the minimum delivery air temperature is less than the second preset temperature deviation value.

It should be understood that, in one embodiment, it is judged whether the fault occurs in the delivery air temperature sensor by detecting whether the delivery air temperature sensor of the fresh air machine has open circuit or short circuit. In another embodiment, it is judged whether the delivery air temperature sensor has a temperature detection function and further it is judged whether the fault occurs in the delivery air temperature sensor. For example, when the delivery air temperature sensor detects no temperature, it is judged that the fault occurs in the delivery air temperature sensor.

In detail, with the method for controlling the fresh air machine provided in the embodiment, the delivery air temperature of the fresh air machine is detected every second preset detection cycle T2, so as to obtain the current delivery air temperature of the fresh air machine. The second preset detection cycle T2, the second preset period mT, the third preset period n2T and the second preset temperature deviation value ΔTa may be set according to actual situations. In this embodiment, the second preset detection cycle T2 may be from 10 seconds to 15 seconds, the second preset period mT may be from 2 minutes to 3 minutes, the third preset period n2T also may be from 2 minutes to 3 minutes, and the second preset temperature deviation value ΔTa may be from 1.5° C. to 2° C. Preferably, in the embodiment, the second preset detection cycle T2 may be 10 seconds, the second preset period mT may be 3 minutes, the third preset period n2T may be 2 minutes, and the second preset temperature deviation value ΔTa may be 1.5° C., which may be taken as an example for detailed description below.

For example, when the fan motor in the fresh air machine operates for 3 minutes (i.e., the second preset period mT), the delivery air temperature of the fresh air machine is detected every 10 seconds (i.e., the second preset detection cycle T2) by the delivery air temperature sensor at the delivery air outlet of the fresh air machine, and the maximum delivery air temperature Tamax and the minimum delivery air temperature Tamin within 2 minutes (i.e., the third preset period n2T) are recorded; then, it is judged whether the difference between the maximum delivery air temperature Tamax and the minimum delivery air temperature Tamin is less than the second preset temperature deviation value ΔTa, i.e., it is judged whether |Tamax−Tamin|<ΔTa (that is, whether |Tamax|Tamin|<1.5° C.); and then it is judged that the fault does not occur in the delivery air temperature sensor at the delivery air outlet of the fresh air machine when the difference between the maximum delivery air temperature Tamax and the minimum delivery air temperature Tamin is less than 1.5° C.

With the method for controlling the fresh air machine provided in the embodiment of the present disclosure, it is judged whether the fault occurs in the delivery air temperature sensor of the fresh air machine according to the maximum delivery air temperature Tamax and the minimum delivery air temperature Tamin recorded within the third preset period n2T, and the second preset temperature deviation value ΔTa. When |Tamax−Tamin|<ΔTa, it is judged that the fault does not occur in the delivery air temperature sensor. When the fault does not occur in the delivery air temperature sensor of the fresh air machine, the delivery air temperature of the fresh air machine is obtained and the obtained delivery air temperature is taken as the new return air temperature to control the fresh air machine to operate again, thereby improving the usage experience of the user for the air-conditioner.

Figure 4:
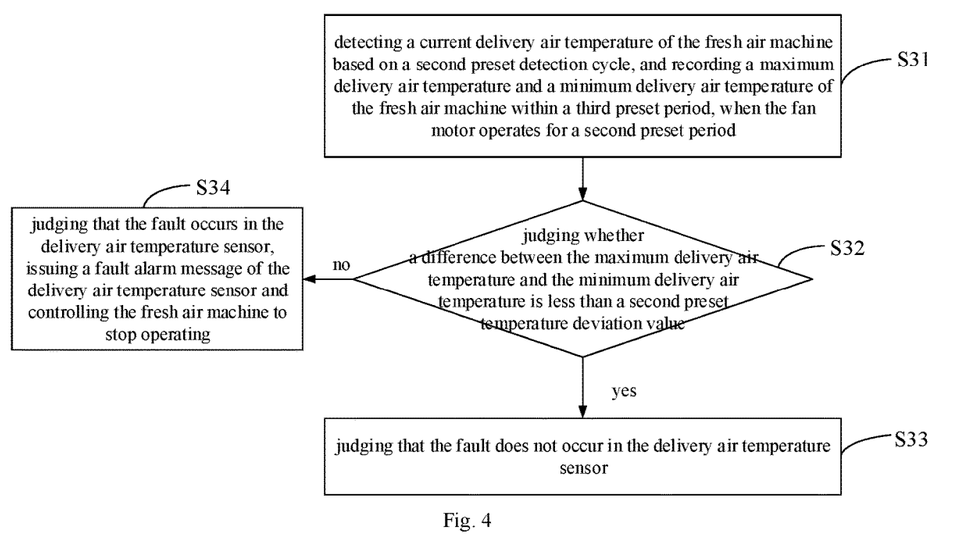
FIG. 4 is a flow chart of a method for controlling a fresh air machine according to a fourth embodiment of the present disclosure.

Further, as illustrated in FIG. 4, based on the method for controlling the fresh air machine provided in the third embodiment of the present disclosure, in the method for controlling the fresh air machine provided in the fourth embodiment of the present disclosure, the method further includes followings after block S33.

In block S34, when the difference between the maximum delivery air temperature and the minimum delivery air temperature is greater than or equal to the second preset temperature deviation value, it is judged that the fault occurs in the delivery air temperature sensor, a fault alarm message of the delivery air temperature sensor is issued, and the fresh air machine is controlled to stop operating.

In the embodiment, when the difference between the maximum delivery air temperature Tamax and the minimum delivery air temperature Tamin is greater than or equal to the second preset temperature deviation value ΔTa, i.e., |Tamax−Tamin|≥ΔTa, it is judged that the fault also occurs in the delivery air temperature sensor, and the fault alarm message of the delivery air temperature sensor is issued, and the fresh air machine is controlled to stop operating. That is, with the method for controlling the fresh air machine provided in the embodiment of the present disclosure, the fresh air machine may operate again before it is judged that the fault occurs in the delivery air temperature sensor of the fresh air machine, thereby improving the usage experience of the user for the air-conditioner.

Figure 5:
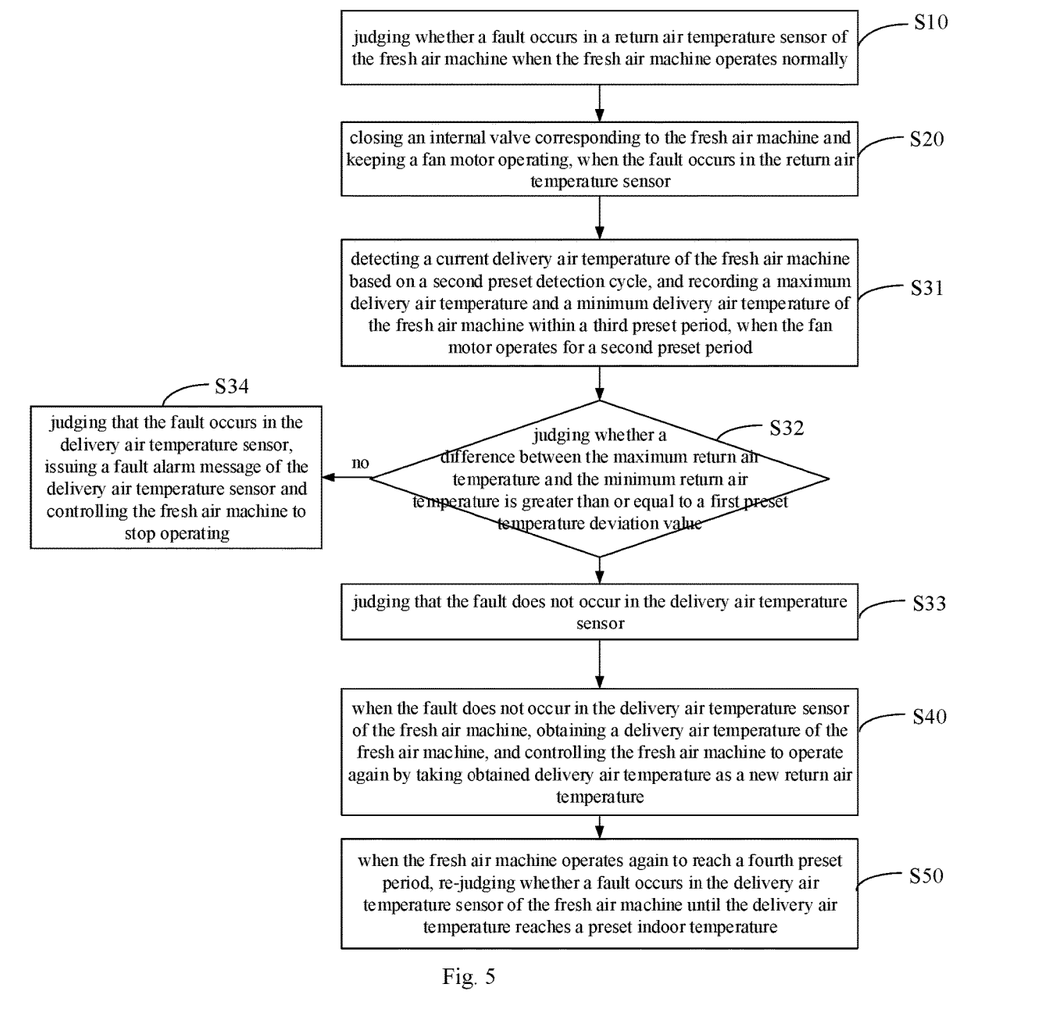
FIG. 5 is a flow chart of a method for controlling a fresh air machine according to a fifth embodiment of the present disclosure.

Further, as illustrated in FIG. 5, based on the method for controlling the fresh air machine provided in any one of the embodiments of the present disclosure, in the method for controlling the fresh air machine provided in the fifth embodiment of the present disclosure, the method further includes followings after block S40.

In block S50, when the fresh air machine operates again to reach a fourth preset period, it is re judged whether the fault occurs in the delivery air temperature sensor of the fresh air machine until the delivery air temperature reaches a preset indoor temperature.

It should be understood that the fourth preset period and the indoor set temperature may be set according to actual situations. In this embodiment, the fourth preset period may be from 1 hour to 2 hours and the preset indoor temperature may be from 25° C. to 27° C. Preferably, in the embodiment, the fourth preset period may be 1 hour and the preset indoor temperature may be 26° C. Hereinafter, detailed description will be made by taking above said as an example. With the method for controlling the fresh air machine provided in the embodiment of the present disclosure, when 1 hour has elapsed since the fresh air machine operates again, it is judged again whether the fault occurs in the delivery air temperature sensor of the fresh air machine until the delivery air temperature reaches the preset indoor temperature, i.e., when the delivery air temperature of the fresh air machine reaches the preset indoor temperature 26° C., it may stop determining whether the fault occurs in the delivery air temperature sensor of the fresh air machine. That is, with the method for controlling the fresh air machine provided in the embodiment of the present disclosure, when the fresh air machine operates again, every time the operation period reaches 1 hour, it is judged whether the fault occurs in the delivery air temperature sensor of the fresh air machine, until the delivery air temperature reaches the preset indoor temperature, thereby ensuring that the delivery air temperature sensor works normally when the fresh air machine operates again, and ensuring safety when the fresh air machine operates again, and improving the usage experience of the user for the air-conditioner.

In addition, the present disclosure also provides a non-transitory computer-readable storage medium having stored therein computer programs. When the programs are executed by a processor, the above method for controlling the fresh air machine is realized.

Figure 6:
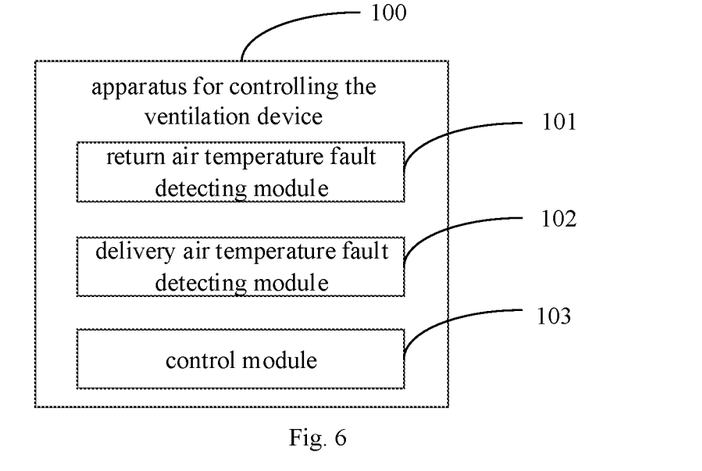
FIG. 6 is a block diagram of an apparatus for controlling a fresh air machine according to a first embodiment of the present disclosure.

The present disclosure also provides a fresh air machine. The fresh air machine includes an inlet channel, an exhaust channel and a heat exchanger provided on the inlet channel, the exhaust channel is configured to exhaust indoor air to outdoor, and the inlet channel is configured to blow outdoor air to indoor after the outdoor air passes through heat exchanging of the heat exchanger. As illustrated in FIG. 6, in an embodiment, the fresh air machine further includes an apparatus for controlling the fresh air machine and the apparatus 100 includes a return air temperature fault detecting module 101, a delivery air temperature fault detecting module 102 and a control module 103.

The return air temperature fault detecting module 101 is configured to determine whether a fault occurs in a return air temperature sensor of the fresh air machine when the fresh air machine operates normally.

The apparatus for controlling the fresh air machine provided in the embodiment of the present disclosure is mainly applied in a control system of the fresh air machine of an air-conditioner, and configured to solve the problem that the fresh air machine cannot operate again when the fault occurs in the return air temperature sensor of the fresh air machine, which thereby affects the usage experience of the user for the air-conditioner. In an air-conditioner system, the return air temperature sensor is provided at a return air inlet (i.e., a channel port of the exhaust channel of the fresh air machine) of the fresh air machine of the air-conditioner, and a delivery air temperature sensor is provided at a delivery air outlet (i.e., a channel port of the inlet channel of the fresh air machine) of the fresh air machine of the air-conditioner. The temperature at the return air inlet of the fresh air machine is detected by the return air temperature sensor and the temperature at the delivery air outlet of the fresh air machine is detected by the delivery air temperature sensor. The return air temperature of the fresh air machine is taken as a temperature control parameter of the fresh air machine to control the operation of the fresh air machine, so as to realize a control of indoor temperature. In detail, when the air-conditioner operates, the air-conditioner takes a target temperature (e.g., 26° C.) set by a user as a final target temperature and realizes the control of the indoor temperature by controlling a frequency of a compressor and/or a rotating speed of a fan motor in the fresh air machine, such that the indoor temperature may finally reach the target temperature (e.g., 26° C.) set by the user. In addition, it should be noted that, the indoor temperature is obtained by the return air temperature sensor at the return air inlet (i.e., the channel port of the exhaust channel of the fresh air machine) of the fresh air machine, i.e. the current return air temperature at the return air inlet of the fresh air machine is taken as the current indoor temperature.

In this embodiment, in order to solve the problem that the fresh air machine cannot operate again when the fault occurs in the return air temperature sensor of the fresh air machine, with the apparatus for controlling the fresh air machine provided in the embodiment of the present disclosure, first, it is judged by the return air temperature fault detecting module 101 whether the fault occurs in the return air temperature sensor at the return air inlet of the fresh air machine when the fresh air machine operates normally.

The delivery air temperature fault detecting module 102 is configured to determine whether a fault occurs in the delivery air temperature sensor of the fresh air machine.

The control module 103 is configured to close an internal valve corresponding to the fresh air machine and to keep a fan motor operating when the fault occurs in the return air temperature sensor; and to obtain a delivery air temperature of the fresh air machine and control the fresh air machine to operate again by taking the obtained delivery air temperature as a new return air temperature when the fault does not occur in the delivery air temperature sensor of the fresh air machine.

In detail, if the fresh air machine operates normally, the control module 103 closes the internal valve corresponding to the fresh air machine (i.e., controls the fresh air machine to stop a refrigerant circulation) and controls the fan motor in the fresh air machine to operate continuously, when the return air temperature fault detecting module 101 judges that the fault occurs in the return air temperature sensor of the fresh air machine. It should be noted that, in this embodiment, when the return air temperature fault detecting module 101 judges that the fault occurs in the return air temperature sensor, although the fresh air machine does not have a function of refrigeration and heating, the control module 103 controls the fresh air machine to still blow outdoor air to indoor, thereby improving quality of indoor air. In this embodiment, when the return air temperature fault detecting module 101 judges that the fault occurs in the return air temperature sensor, the control module 103 controls the fan motor of the fresh air machine to continuously operate while the internal valve corresponding to the fresh air machine is closed. At this moment, it is judged by the delivery air temperature fault detecting module 102 whether the fault occurs in the delivery air temperature sensor of the fresh air machine and it is determined by the control module 103 whether to obtain the delivery air temperature according to a judgment result. In this embodiment, when the delivery air temperature fault detecting module 102 judges that the fault does not occur in the delivery air temperature sensor of the fresh air machine, the control module 103 obtains the delivery air temperature of the fresh air machine and controls the fresh air machine to operate again by taking the obtained delivery air temperature as the new return air temperature.

With the apparatus for controlling the fresh air machine provided in the embodiment of the present disclosure, first, the return air temperature fault detecting module 101 judges whether the fault occurs in the return air temperature sensor of the fresh air machine when the fresh air machine operates normally; then the control module 103 closes the internal valve corresponding to the fresh air machine and controls the fan motor to keep operating, when the fault occurs in the return air temperature sensor; then the delivery air temperature fault detecting module 102 judges whether the fault occurs in the delivery air temperature sensor of the fresh air machine; and finally the control module 103 obtains the delivery air temperature of the fresh air machine and controls the fresh air machine to operate again by taking the obtained delivery air temperature as the new return air temperature when the delivery air temperature fault detecting module 102 judges that the fault does not occur in the delivery air temperature sensor of the fresh air machine. The apparatus for controlling the fresh air machine in the present disclosure may solve the problem that the fresh air machine cannot operate again when the fault occurs in the return air temperature sensor of the fresh air machine, thereby improving the usage experience of the user for the air-conditioner.

Figure 7:
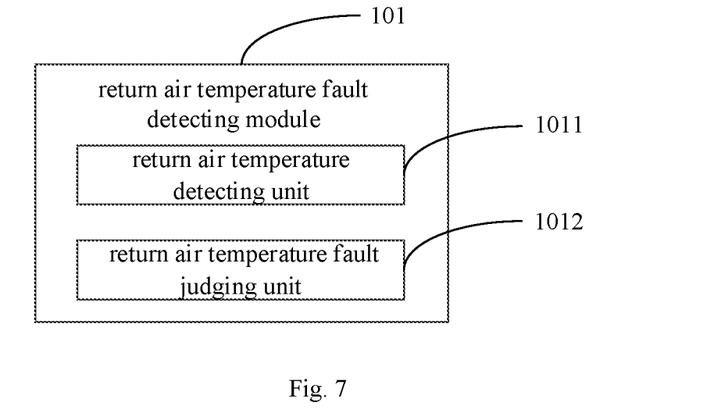
FIG. 7 is a block diagram of a return air temperature fault detecting module in an apparatus for controlling a fresh air machine according to a second embodiment of the present disclosure.

Further, as illustrated in FIG. 7, based on the apparatus for controlling the fresh air machine provided in the first embodiment of the present disclosure, in the apparatus for controlling the fresh air machine provided in the second embodiment of the present disclosure, the return air temperature fault detecting module 101 includes a return air temperature detecting unit 1011 and a return air temperature fault judging unit 1012.

The return air temperature detecting unit 1011 is configured to detect a return air temperature of the fresh air machine based on a first preset detection cycle when the fresh air machine operates normally and to record a maximum return air temperature and a minimum return air temperature of the fresh air machine within a first preset period according to the detected return air temperature of the fresh air machine.

The return air temperature fault judging unit 1012 is configured to determine whether a difference between the maximum return air temperature and the minimum return air temperature is greater than or equal to a first preset temperature deviation value, and to judge that the fault occurs in the return air temperature sensor and issue a fault alarm message of the return air temperature sensor when the difference between the maximum return air temperature and the minimum return air temperature is greater than or equal to the first preset temperature deviation value.

It is to be understood that, in one embodiment, it is judged whether the fault occurs in the return air temperature sensor by detecting whether the return air temperature sensor of the fresh air machine has open circuit or short circuit. In another embodiment, it is judged whether the return air temperature sensor has a temperature detection function and further it is judged whether the fault occurs in the return air temperature sensor. For example, when the return air temperature sensor detects no temperature, it is judged that the fault occurs in the return air temperature sensor.

In detail, with the apparatus for controlling the fresh air machine provided in the embodiment, the return air temperature detecting unit 1011 detects the return air temperature of the fresh air machine every first preset detection cycle T, so as to obtain the current return air temperature of the fresh air machine. The first preset detection cycle T, the first preset period nT and the first preset temperature deviation value ΔT1 may be set according to actual situations. In this embodiment, the first preset detection cycle T may be from 10 seconds to 15 seconds, the first preset period nT may be from 2 minutes to 3 minutes, and the first preset temperature deviation value ΔT1 may be from 1.5° C. to 2° C. Preferably, in the embodiment, the first preset detection cycle T may be 10 seconds, the first preset period nT may be 2 minutes and the first preset temperature deviation value ΔT1 may be 1.5° C., which may be taken as example for detailed description below.

For example, when the fresh air machine operates normally, first, the return air temperature detecting unit 1011 detects the return air temperature of the fresh air machine every 10 seconds and records the maximum return air temperature T1max and the minimum return air temperature T1min within 2 minutes according to the return air temperature of the fresh air machine detected by the return air temperature sensor; then, the return air temperature fault judging unit 1012 judges whether the difference between the maximum return air temperature T1max and the minimum return air temperature T1min is greater than or equal to the first preset temperature deviation value ΔT1, i.e., whether |T1max−T1min|≥ΔT1 (that is, whether |T1max−T1min|≥1.5° C.); when the difference between the maximum return air temperature T1max and the minimum return air temperature T1min is greater than or equal to 1.5° C., the return air temperature fault judging unit 1012 judges that the fault occurs in the return air temperature sensor at the air return inlet of the fresh air machine, and meanwhile, the return air temperature fault judging unit 1012 issues the fault alarm message of the return air temperature sensor, so as to prompt the user that the fault occurs in the return air temperature sensor of the fresh air machine.

With the apparatus for controlling the fresh air machine provided in the embodiment of the present disclosure, the return air temperature fault judging unit 1012 judges whether the fault occurs in the return air temperature sensor of the fresh air machine according to the maximum return air temperature T1max and the minimum return air temperature T1min recorded within the first preset period nT by the return air temperature detecting unit 1011, and the first preset temperature deviation value ΔT1. When |T1max−T1min|≥ΔT1, the return air temperature fault judging unit 1012 judges that the fault occurs in the return air temperature sensor and issues the fault alarm message of the return air temperature sensor. When the fault occurs in the return air temperature sensor, the internal valve corresponding to the fresh air machine is closed and the fan motor in the fresh air machine is kept operating; then it is judged whether the fault occurs in the delivery air temperature sensor of the fresh air machine; and then when the fault does not occur in the delivery air temperature sensor of the fresh air machine, the delivery air temperature of the fresh air machine is obtained and the obtained delivery air temperature is taken as the new return air temperature to control the fresh air machine to operate again, thereby improving the usage experience of the user for the air-conditioner.

Figure 8:
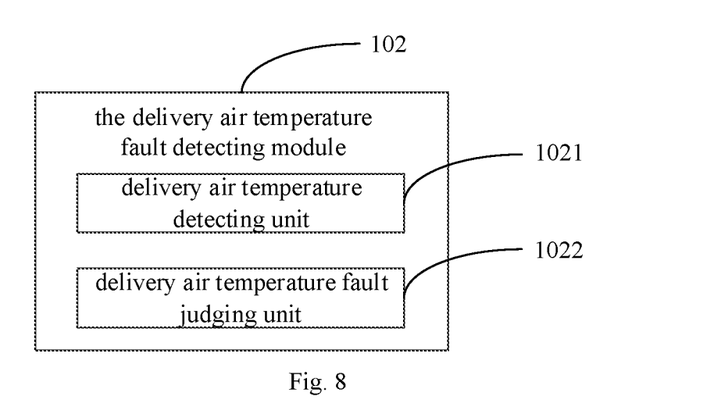
FIG. 8 is a block diagram of a delivery air temperature fault detecting module in an apparatus for controlling a fresh air machine according to a third embodiment of the present disclosure.

Further, as illustrated in FIG. 8, based on the apparatus for controlling the fresh air machine provided in the first embodiment of the present disclosure, in the apparatus for controlling the fresh air machine provided in the third embodiment of the present disclosure, the delivery air temperature fault detecting module 102 includes a delivery air temperature detecting unit 1021, and a delivery air temperature fault judging unit 1022.

The delivery air temperature detecting unit 1021 is configured to detect a current delivery air temperature of the fresh air machine based on a second preset detection cycle, and to record a maximum delivery air temperature and a minimum delivery air temperature of the fresh air machine within a third preset period, when the fan motor operates for a second preset period.

The delivery air temperature fault judging unit 1022 is configured to determine whether a difference between the maximum delivery air temperature and the minimum delivery air temperature is less than a second preset temperature deviation value; and to judge that the fault does not occur in the delivery air temperature sensor when the difference between the maximum delivery air temperature and the minimum delivery air temperature is less than the second preset temperature deviation value.

It should be understood that, in one embodiment, it is judged whether the fault occurs in the delivery air temperature sensor by detecting whether the delivery air temperature sensor of the fresh air machine has open circuit or short circuit. In another embodiment, it is judged whether the delivery air temperature sensor has a temperature detection function and further it is judged whether the fault occurs in the delivery air temperature sensor. For example, when the delivery air temperature sensor detects no temperature, it is judged that the fault occurs in the delivery air temperature sensor.

In detail, with the apparatus for controlling the fresh air machine provided in the embodiment, the delivery air temperature detecting unit 1021 detects the delivery air temperature of the fresh air machine every second preset detection cycle T2, so as to obtain the current delivery air temperature of the fresh air machine. The second preset detection cycle T2, the second preset period mT, the third preset period n2T and the second preset temperature deviation value ΔTa may be set according to actual situations. In this embodiment, the second preset detection cycle T2 may be from 10 seconds to 15 seconds, the second preset period mT may be from 2 minutes to 3 minutes, the third preset period n2T also may be from 2 minutes to 3 minutes, and the second preset temperature deviation value ΔTa may be from 1.5° C. to 2° C. Preferably, in the embodiment, the second preset detection cycle T2 may be 10 seconds, the second preset period mT may be 3 minutes, the third preset period n2T may be 2 minutes, and the second preset temperature deviation value ΔTa may be 1.5° C., which may be taken as an example for detailed description below.

For example, when the fan motor in the fresh air machine operates for 3 minutes (i.e., the second preset period mT), the delivery air temperature detecting unit 1021 detects the delivery air temperature of the fresh air machine every 10 seconds (i.e., the second preset detection cycle T2) and records the maximum delivery air temperature Tamax and the minimum delivery air temperature Tamin within 2 minutes (i.e., the third preset period n2T); then, the delivery air temperature fault judging unit 1022 judges whether the difference between the maximum delivery air temperature Tamax and the minimum delivery air temperature Tamin is less than the second preset temperature deviation value ΔTa, i.e., whether |Tamax−Tamin|<ΔTa (that is, whether |Tamax−Tamin|<1.5° C.); and then the delivery air temperature fault judging unit 1022 judges that the fault does not occur in the delivery air temperature sensor at the delivery air outlet of the fresh air machine when the delivery air temperature fault judging unit 1022 judges that the maximum delivery air temperature Tamax and the minimum delivery air temperature Tamin is less than 1.5° C.

With the apparatus for controlling the fresh air machine provided in the embodiment of the present disclosure, the delivery air temperature fault judging unit 1022 judges whether the fault occurs in the delivery air temperature sensor of the fresh air machine according to the maximum delivery air temperature Tamax and the minimum delivery air temperature Tamin recorded within the third preset period n2T by the delivery air temperature detecting unit 1021 and the second preset temperature deviation value ΔTa. When |Tamax−Tamin|<ΔTa, the delivery air temperature fault judging unit 1022 judges that the fault does not occur in the delivery air temperature sensor. When the fault does not occur in the delivery air temperature sensor of the fresh air machine, the delivery air temperature of the fresh air machine is obtained and the obtained delivery air temperature is taken as the new return air temperature to control the fresh air machine to operate again, thereby improving the usage experience of the user for the air-conditioner.

Further, with the apparatus for controlling the fresh air machine provided in the embodiment of the present disclosure, the delivery air temperature fault judging unit 1022 is further configured to: when the difference between the maximum delivery air temperature and the minimum delivery air temperature is greater than or equal to the second preset temperature deviation value, judge that the fault occurs in the delivery air temperature sensor and issue a fault alarm message of the delivery air temperature sensor and control the fresh air machine to stop operating.

In detail, in the embodiment, when the difference between the maximum delivery air temperature Tamax and the minimum delivery air temperature Tamin is greater than or equal to the second preset temperature deviation value ΔTa, i.e., |Tamax−Tamin|≥ΔTa, the delivery air temperature fault judging unit 1022 judges that the fault also occurs in the delivery air temperature sensor, and issues the fault alarm message of the delivery air temperature sensor and the fresh air machine is controlled to stop operating. That is, with the apparatus for controlling the fresh air machine provided in the embodiment of the present disclosure, the fresh air machine may operate again before it is judged that the fault occurs in the delivery air temperature sensor of the fresh air machine, thereby improving the usage experience of the user for the air-conditioner.

Further, with the apparatus for controlling the fresh air machine provided in the embodiment of the present disclosure, the delivery air temperature fault judging unit 1022 is further configured to: re-determine whether the fault occurs in the delivery air temperature sensor of the fresh air machine until the delivery air temperature reaches a preset indoor temperature, when the fresh air machine operates again to reach a fourth preset period.

It should be understood that the fourth preset period and the preset indoor temperature may be set according to actual situations. In this embodiment, the fourth preset period may be from 1 hour to 2 hours and the preset indoor temperature may be from 25° C. to 27° C. Preferably, in the embodiment, the fourth preset period may be 1 hour and the preset indoor temperature may be 26° C. Hereinafter, detailed description will be made by taking above said as an example. With the apparatus for controlling the fresh air machine provided in the embodiment of the present disclosure, when 1 hour has elapsed since the fresh air machine operates again, the delivery air temperature fault judging unit 1022 judges again whether the fault occurs in the delivery air temperature sensor of the fresh air machine, until the delivery air temperature reaches the preset indoor temperature, i.e., when the delivery air temperature of the fresh air machine reaches the preset indoor temperature 26° C., the delivery air temperature fault judging unit 1022 may stop determining whether the fault occurs in the delivery air temperature sensor of the fresh air machine. That is, with the apparatus for controlling the fresh air machine provided in the embodiment of the present disclosure, when the fresh air machine operates again, every time the operation period reaches 1 hour, the delivery air temperature fault judging unit 1022 judges whether the fault occurs in the delivery air temperature sensor of the fresh air machine, until the delivery air temperature reaches the preset indoor temperature, thereby ensuring that the delivery air temperature sensor works normally when the fresh air machine operates again, and ensuring safety when the fresh air machine operates again, and improving the usage experience of the user for the air-conditioner.

The foregoing is only a preferred embodiment of the present disclosure and is not intended to limit the scope of the present disclosure as claimed by the appended claims. Any equivalent structure or equivalent process transformation made using the present specification and the accompanying drawings, either directly or indirectly applied in other related technical fields, is likewise included within the scope of the patent protection of the present disclosure.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

What is claimed is:

1. A method for controlling a fresh air machine of an air-conditioner when a fault occurs, the method comprises:
    determining whether the fault occurs in a return air temperature sensor of the fresh air machine during normal operation of the fresh air machine, wherein the determining whether the fault occurs in the return air temperature sensor of the fresh air machine during normal operation of the fresh air machine comprises:
    detecting a return air temperature of the fresh air machine based on a first preset detection cycle when the fresh air machine operates normally;
    recording a maximum return air temperature and a minimum return air temperature of the fresh air machine within a first preset period according to detected return air temperature of the fresh air machine;
    determining whether a difference between the maximum return air temperature and the minimum return air temperature is greater than or equal to a first preset temperature deviation value;
    determining that the fault occurs in the return air temperature sensor of the fresh air machine during normal operation of the fresh air machine when the difference between the maximum return air temperature and the minimum return air temperature is greater than or equal to the first preset temperature deviation value;
    in accordance with a determination that the fault occurs in the return air temperature sensor:
        issuing a fault alarm message of the return air temperature sensor;
        closing an internal valve corresponding to the fresh air machine to stop a refrigerant circulation and keeping a fan motor operating;
        determining whether a fault occurs in a delivery air temperature sensor of the fresh air machine;
    in accordance with a determination that the fault does not occur in the delivery air temperature sensor:
        obtaining a delivery air temperature of the fresh air machine; and
        controlling the fresh air machine to operate again using the obtained delivery air temperature as a new return air temperature, and wherein controlling the fresh air machine to operate again comprises opening the internal valve corresponding to the fresh air machine.

2. The method according to claim 1, wherein determining whether a fault occurs in a delivery air temperature sensor of the fresh air machine comprises:
    detecting a current delivery air temperature of the fresh air machine based on a second preset detection cycle;
    recording a maximum delivery air temperature and a minimum delivery air temperature of the fresh air machine within a third preset period, when the fan motor operates for a second preset period;
    determining whether a difference between the maximum delivery air temperature and the minimum delivery air temperature is less than a second preset temperature deviation value; and
    determining that the fault does not occur in the delivery air temperature sensor when the difference between the maximum delivery air temperature and the minimum delivery air temperature is less than the second preset temperature deviation value.

3. The method according to claim 2, further comprising:
    after determining whether a difference between the maximum delivery air temperature and the minimum delivery air temperature is less than a second preset temperature deviation value:
    when the difference between the maximum delivery air temperature and the minimum delivery air temperature is greater than or equal to the second preset temperature deviation value: determining that the fault occurs in the delivery air temperature sensor, issuing a fault alarm message of the delivery air temperature sensor and controlling the fresh air machine to stop operating.

4. The method according to claim 1, further comprising:
    after controlling the fresh air machine to operate again by using the obtained delivery air temperature as a new return air temperature, when the fresh air machine operates again to reach a fourth preset period, re-determining whether a fault occurs in the delivery air temperature sensor of the fresh air machine until the delivery air temperature reaches a preset indoor temperature.

5. A non-transitory computer-readable storage medium having stored therein computer programs that, when executed by a processor, perform a method for controlling a fresh air machine of an air-conditioner when a fault occurs, the method further including:
    determining whether the fault occurs in a return air temperature sensor of the fresh air machine during normal operation of the fresh air machine, wherein the determining whether the fault occurs in the return air temperature sensor of the fresh air machine during normal operation of the fresh air machine comprises:
    detecting a return air temperature of the fresh air machine based on a first preset detection cycle when the fresh air machine operates normally;
    recording a maximum return air temperature and a minimum return air temperature of the fresh air machine within a first preset period according to detected return air temperature of the fresh air machine; and
    determining whether a difference between the maximum return air temperature and the minimum return air temperature is greater than or equal to a first preset temperature deviation value;
    determining that the fault occurs in the return air temperature sensor of the fresh air machine during normal operation of the fresh air machine when the difference between the maximum return air temperature and the minimum return air temperature is greater than or equal to the first preset temperature deviation value;

in accordance with a determination that the fault occurs in the return air temperature sensor:

issuing a fault alarm message of the return air temperature sensor;

closing an internal valve corresponding to the fresh air machine to stop a refrigerant circulation and keeping a fan motor operating; and determining whether a fault occurs in a delivery air temperature sensor of the fresh air machine;

in accordance with a determination that the fault does not occur in the delivery air temperature sensor:

obtaining a delivery air temperature of the fresh air machine; and controlling the fresh air machine to operate again using the obtained delivery air temperature as a new return air temperature, and wherein controlling the fresh air machine to operate again comprises opening the internal valve corresponding to the fresh air machine.

6. The non-transitory computer-readable storage medium according to claim 5, wherein determining whether a fault occurs in a delivery air temperature sensor of the fresh air machine comprises:

detecting a current delivery air temperature of the fresh air machine based on a second preset detection cycle;

recording a maximum delivery air temperature and a minimum delivery air temperature of the fresh air machine within a third preset period, when the fan motor operates for a second preset period;

determining whether a difference between the maximum delivery air temperature and the minimum delivery air temperature is less than a second preset temperature deviation value; and determining that the fault does not occur in the delivery air temperature sensor when the difference between the maximum delivery air temperature and the minimum delivery air temperature is less than the second preset temperature deviation value.

7. The non-transitory computer-readable storage medium according to claim 6, wherein the method further comprises:

after determining whether a difference between the maximum delivery air temperature and the minimum delivery air temperature is less than a second preset temperature deviation value:

when the difference between the maximum delivery air temperature and the minimum delivery air temperature is greater than or equal to the second preset temperature deviation value: determining that the fault occurs in the delivery air temperature sensor, issuing a fault alarm message of the delivery air temperature sensor and controlling the fresh air machine to stop operating.

8. The non-transitory computer-readable storage medium according to claim 5, wherein the method further comprises: after controlling the fresh air machine to operate again by using the obtained delivery air temperature as a new return air temperature, when the fresh air machine operates again to reach a fourth preset period, re-determining whether a fault occurs in the delivery air temperature sensor of the fresh air machine until the delivery air temperature reaches a preset indoor temperature.

* * * * *